United States Patent Office 3,436,364
Patented Apr. 1, 1969

3,436,364
STABILIZED SOLUTIONS OF COPOLYMERS FROM ACRYLONITRILE AND VINYLIDENE CHLORIDE
Heino Logemann, Leverkusen-Schlebusch, Ernst Roos, Cologne-Flittard, and Carlhans Suling, Leverkusen, Germany, assignors to Farbenfabriken Bayer Aktiengesellschaft, Leverkusen, Germany, a corporation of Germany
No Drawing. Filed July 29, 1965, Ser. No. 475,845
Claims priority, application Germany, Aug. 24, 1964, F 43,815; Aug. 25, 1964, F 43,821; Aug. 27, 1964, F 43,835, F 43,837
Int. Cl. C08f 45/44, 45/56, 45/62
U.S. Cl. 260—32.6        8 Claims

ABSTRACT OF THE DISCLOSURE

There is disclosed a process for stabilizing solutions of copolymers of acrylonitrile and vinylindene chloride that contain 20 to 60% of chlorine against the action of heat. According to the invention solutions of such copolymers in polar organic solvents are stabilized by means of a zinc salt of one of the following: alkyl sulfuric acids, aryl sulfonic acids free of hydroxyl groups on the α-carbon atoms thereof, carboxylic acids having 1 to 10 carbon atoms, inorganic acids and mercaptans, the salts being employed in an amount of 0.5 to 1.5% by weight based on the copolymer.

The resulting solutions and/or films and fibers produced therefrom do not undergo discoloration either in the spinning process or in the further working of the films and fibers.

---

This invention relates to solutions of copolymers from acrylonitrile and vinylidene chloride stabilized with a zinc compound against action of heat.

Several different types of stabilizers have been suggested for polyacrylonitrile and copolymers of acrylonitrile containing more than 80% of acrylonitrile. Such stabilizers are intended to protect fibres and films prepared from this material against discoloration under the influence of elevated temperatures. Such discoloration can actually occur during the preparation of the fibres and films, for example during the preparation of the spinning solutions, during the spinning process itself and during the subsequent fixing and crimping of the fibres. Unfortunately, the aforementioned stabilizers cannot be used to protect fibres and films prepared from copolymers of acrylonitrile with vinylidene chloride containing more than 20 to 60% of chlorine, against discoloration under the influence of heat.

Similarly, the various stabilizers and combinations thereof which have been proposed for moldings of pure polyvinyl chloride and polyvinylidene chloride or of copolymers containing a large amount of vinyl chloride or vinylidene chloride, particularly for thick-walled pressings and moldings, cannot be used for the production of fibres and films from copolymers of acrylonitrile with vinylidene chloride.

The difference between the copolymers of acrylonitrile with vinylidene chloride containing at least 20% of chlorine and those of acrylonitrile containing at least 80% of combined acrylonitrile, is embodied in peculiarities highly characteristic of polymers. For example, it is not possible to prepare homogeneous solutions in dimethyl formamide from the mixture of an acrylonitrile-vinylidene chloride copolymer (30% chlorine) and an acrylonitrile polymer containing at least 80% of combined acrylonitrile. The two copolymers are each clearly soluble in dimethyl formamide. However, solutions of the two copolymers in dimethyl formamide cannot be mixed together without the formation of two phases. Neither can a mixture of the two polymers be dissolved without the formation of two phases. The limit at which the polymers in solution in dimethyl formamide are compatible with one another, lies exactly at the content of about 28% of combined vinylidene chloride. Polymers of vinylidene chloride by themselves and those containing a small amount of a copolymerization component actually become insoluble in any type of solvent during their preparation. The different structure of the three types of copolymer which is apparent from their solubility, explains why the degradation reactions which each polymer undergoes at elevated temperature are basically different and why each type is inhibited by different types of stabilizer. The large number of heat stabilizers which have been used for acrylonitrile copolymers containing more than 80% of acrylonitrile, have proved to be completely unsuitable for stabilizing acrylonitrile-vinylidene chloride polymers containing more than 20% of chlorine. Similarly, the conventional stabilizers for polyvinyl chloride cannot be used to stabilize acrylonitrile-vinylidene chloride copolymers containing 20 to 60% of chlorine.

Zinc salts of higher fatty acids, such as zinc stearate, have been used as stabilizers, for example for polyvinyl chloride moldings. These stabilizers are generally used in combination with others. Unfortunately, their stabilizing effect on the fibres or films prepared from copolymers of acrylonitrile with vinylidene chloride containing 20 to 60% of chlorine has proved to be inadequate. It is also known that solutions of polymers containing more than 80% of acrylonitrile in solvents such as dimethyl acetamide, can be stabilized by the sodium, potassium or zinc salts of sulphinic acids derived from formaldehyde sulphoxyl acid, i.e. they contain the group

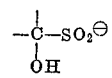

as a grouping indicative of their constitution.

Stabilizers such as these are attended by the serious disadvantage of being difficultly soluble in dimethyl formamide. For example, significantly less than 0.1% of sodium formaldehyde sulphoxylate, and about 0.1% of zinc formaldehyde sulphoxylate, are soluble in dimethyl formamide at room temperature. Stabilizers as difficultly soluble as these, cannot be used in spinning because there is always the danger of the spinnerets becoming blocked with deposited salt crusts. In the case of chlorine containing copolymers of acrylonitrile, swellings which become highly discolored under the influence of heat, are formed around the undissolved particles of the sulphoxyl acid salt at elevated temperature. It has also been found that the aforementioned sulphoxyl acid salts are able to stabilize copolymers of acrylonitrile containing more than 80% of acrylonitrile only to a certain extent under the influence of heat. For example, solutions of these copolymers in dimethyl formamide are slightly discolored in their presence when exposed for some minutes to a temperature of 80 to 90° C. Beyond these temperatures, however, these compounds turn brown.

It has now been found that the zinc salts of alkyl or aryl sulphinic acids which do not contain a hydroxyl group as substituent on the α-carbon atom, zinc salts of carboxylic acids with 1 to 10 carbon atoms which are soluble in quantities of at least 0.01% in highly polar solvents, zinc salts of inorganic acids or zinc salts of aliphatic, aromatic or heterocyclic mercaptans, may be used to advantage to stabilize against discoloration under the influence of heat solutions of copolymers of acrylonitrile with vinylidene chloride that contain 20 to 60% of chlorine in organic solvents. Unlike the salts of formaldehyde sulphinic acid, the zinc salts of the acids used in accordance with the invention, for example zinc salts of sulphinic acids, are readily soluble in dimethyl formamide at room temperature in quantities of more than 1%. Highly polar solvents, for example, dimethyl formamide or dimethyl acetamide, are used as the solvents for the chlorine-containing acrylonitrile polymers. The polymer content of the solution is from 5 to 35%, preferably from 10 to 30%. It is also possible to employ zinc salts of aralkyl sulphinic acids and of hydroaromatic sulphinic acids in place of the aforementioned zinc salts of alkyl and aryl sulphinic acids. The zinc salt is used in a quantity from 0.1 to 5% by weight, preferably from 0.5 to 1.5% by weight, based on polymer. They may, however, if desired, be used in larger or smaller quantities. Since the zinc salts of the aforementioned sulphinic acids are always readily soluble at room temperature in the required amounts, the spinnerets are not fouled during spinning by salt crusts or by swellings which have formed around undissolved particles of the stabilizer. The stabilizers according to the invention are also effective over long periods under the influence of elevated temperatures, as is apparent from the comparison tests described in the following examples.

By contrast, these compounds are ineffective in a chlorine-free polymer of acrylonitrile. The zinc mercaptides are generally adequately soluble in the organic solvents, so that no depositions are formed around the spinnerets. The zinc mercaptide is preferably used in a quantity from 0.2 to 5%, preferably from 0.5 to 1.4%, based on the polymer. It may, however, be used in larger or smaller quantities if desired. The outstanding stabilizing effect of the zinc mercaptides over long periods at elevated temperature is described in the examples. Although the corresponding mercaptans act as stabilizers as long as the solutions are kept at fairly low temperatures, they do not have any stabilizing effect whatever on solutions of acrylonitrile polymers containing 20 to 60% of chlorine over prolonged periods at elevated temperature. In addition, the trouble caused by the odor of the free mercaptans is completely avoided in cases where zinc mercaptides are used.

Of the zinc salts of inorganic acids, zinc chloride, zinc bromide, zinc iodide or zinc nitrate are preferably used because of their satisfactory solubility in polar solvents. Concentrations of 0.5 to 1.5% by weight and higher, based on the polymer, may be used. Although less readily soluble, zinc borate, zinc borofluoride, zinc silicofluoride and zinc sulphite, may be used in concentrations of up to 0.5% by weight. Zinc phosphate may be used in a concentration of 0.25% by weight and lower, and is highly effective, whereas zinc fluoride and zinc sulphate are too difficultly soluble. Instead of introducing the aforementioned zinc salts together with the polymer into the organic solvent for the preparation of the spinning solution, it is also possible to apply them to the copolymer when the polymers are being worked up or, alternatively, on completion of polymerization.

The low aliphatic monocarboxylic acids containing 1 to 10 carbon atoms, preferably those with a branched carbon chain, yield adequately soluble zinc salts. In these compounds, the carbon chain may contain double or triple bonds. In addition, it may be interrupted or substituted in any way by other groupings such as —CO, —O— or —S—. The zinc salts of aromatic, hydroaromatic and araliphatic carboxylic acids can also be used.

EXAMPLE 1

10% by weight solutions of a copolymer of 60 parts by weight of acrylonitrile and 40 parts by weight of vinylidene chloride in dimethyl foramide are prepared. Solution 1, which is used as the comparison solution, does not contain other additives, whilst the other solutions each contain 0.5 or 1% by weight, based on the polymer, of one of the zinc salts of sulphinic acids listed in the following table. 0.5 and 1% by weight, respectively, of zinc formaldehyde sulphoxylate are added to solutions 12 and 13. Solutions 14 and 15 contain 0.5 to 1% by weight, respectively, of sodium formaldehyde sulphoxylate in combination with 0.5 and 1%, by weight, respectively, of $H_2SO_4$.

Solutions 12 to 15 contain a deposit of undissolved components. The solutions are aged for 16 hours in thermostats at 80° C. Using an extrusion coater, coatings of uniform thickness are extruded from the aged solutions onto glass plates. The resulting films are dried overnight in a drying cabinet at 50° C. The films are removed from the glass plates, clamped in glass frames, washed for one hour in water at 70° C. and then dried again. They are then heat-treated for 4 and 8 hours, respectively, in a through-circulation drying cabinet at 140° C.

The light-absorption of the resulting more or less yellowish-brown films is measured in a General Electric spectral photometer. Since the thickness of each film differs slightly from the desired thickness of 50μ, the measured light-transmission values are corrected for these small differences with the aid of Beer's law. The light absorption of the films is not measured against a clear comparison film. As a result the maximum light transmission which can be obtained amounts to some 92%. Part of the stabilizer added remained undissolved in solutions 12 to 15, even after heating. After the solutions had been heated for 16 hours at 80° C., mixtures 12 to 15 remained fairly light in color, whilst solutions 4 to 7 in particular were extremely light. On the other hand, solutions 12 and 13 contained large amounts of swellings. It was only possible to extrude very uneven films from the more or less gelatinous solutions 12 and 13. Although, after heat treatment at 140° C., these films were on the whole fairly light in color, they contained numerous dark brown patches due to a degration or crosslinking reaction. The optical measurements do not reveal this behavior. It was not possible to obtain useful moldings from solutions 12 to 15, whilst satisfactory films and fibres can be prepared from solutions 2 to 11.

mostats. Films were extruded from the solutions which were washed with water for one hour at 70° C., and then

LIGHT TRANSMITTANCE OF THE 50µ-THICK FILMS IN PERCENT

| | Stabilizer | Appearance of the solution | After 4 hours' ageing at 140° C.; λ in mµ | | | | | After 8 hours' ageing at 140° C.; λ in mµ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 4.1 | 14.5 | 30.8 | 47.0 | 59.8 | 0.1 | 0.5 | 4.0 | 13.3 | 27.1 |
| 2 | 0.5% $(CH_3SO_2)_2Zn$ | do | 13.0 | 29.9 | 47.5 | 61.1 | 70.4 | 2.6 | 10.8 | 25.7 | 41.3 | 54.8 |
| 3 | 1% $(CH_3SO_2)_2Zn$ | do | 13.5 | 31.4 | 49.4 | 63.0 | 72.6 | 3.2 | 13.0 | 29.2 | 45.9 | 59.6 |
| 4 | 0.5% $(ClCH_2SO_2)_2Zn$ | do | 13.7 | 30.8 | 48.0 | 61.4 | 70.4 | 2.4 | 10.4 | 25.1 | 41.4 | 55.2 |
| 5 | 1% $(ClCH_2SO_2)_2Zn$ | do | 31.9 | 51.9 | 65.8 | 74.5 | 79.8 | 0.8 | 4.8 | 16.0 | 32.1 | 47.6 |
| 6 | 0.5% $(ClCH_2CH_2SO_2)_2Zn$ | do | 15.5 | 32.0 | 48.2 | 60.7 | 69.3 | 1.2 | 6.6 | 18.3 | 34.1 | 48.7 |
| 7 | 1% $(ClCH_2CH_2SO_2)_2Zn$ | do | 14.3 | 31.9 | 48.4 | 61.2 | 69.8 | 0.8 | 5.3 | 17.1 | 32.6 | 47.5 |
| 8 | 0.5% $(C_6H_5SO_2)_2Zn$ | do | 18.9 | 37.6 | 54.6 | 66.0 | 73.9 | 9.5 | 24.2 | 41.4 | 55.7 | 65.8 |
| 9 | 1% $(C_6H_5SO_2)_2Zn$ | do | 21.4 | 40.8 | 56.9 | 68.1 | 75.3 | 7.3 | 21.3 | 39.7 | 55.2 | 66.6 |
| 10 | 0.5% $(CH_3\text{-}C_6H_4\text{-}SO_2)_2Zn$ | do | 14.6 | 31.8 | 49.8 | 63.2 | 72.6 | 1.5 | 7.2 | 20.0 | 36.2 | 51.0 |
| 11 | 1% $(CH_3\text{-}C_6H_4\text{-}SO_2)_2Zn$ | do | 26.6 | 47.0 | 62.2 | 71.2 | 78.6 | 6.0 | 19.1 | 36.6 | 52.5 | 64.6 |
| 12 | 0.5% $(CH_2OH.SO_2)_2Zn$ | Deposit and swellings | 16.2 | 38.8 | 52.0 | 61.2 | 69.2 | 7.5 | 20.2 | 36.2 | 50.8 | 61.7 |
| 13 | 1% $(CH_2OH.SO_2)_2Zn$ | do | 23.5 | 42.8 | 58.4 | 69.6 | 77.0 | 1.2 | 6.6 | 19.8 | 36.4 | 51.5 |
| 14 | 0.5% $CH_2OH.SO_2Na + 0.5\%\ H_2SO_4$ | Marked deposit | 1.6 | 7.0 | 19.6 | 35.7 | 50.4 | 0.1 | 0.7 | 4.6 | 14.4 | 28.1 |
| 15 | 1% $CH_2OH.SO_2Na + 1\%\ H_2SO_4$ | do | 1.6 | 7.1 | 20.1 | 36.4 | 52.4 | 0.1 | 0.1 | 2.1 | 10.2 | 24.3 |

EXAMPLE 2.—COMPARISON EXAMPLE

10% by weight solutions of a copolymer of 95 parts by weight of acrylonitrile and 5 parts by weight of methyl acrylate in dimethyl formamide, are prepared. Solution No. 1 which is used as the comparison solution, does not contain any further additives, whilst the following solutions contain either 0.5 or 1% by weight, respectively, based on the polymer, of one of the zinc salts of sulphinic acids listed in the table. 0.5 and 1%, by weight respectively, of zinc formaldehyde sulphoxylate are added to solutions 12 and 13, while solutions 14 and 15 contain 0.5 and 1% by weight, respectively, of sodium formaldehyde sulphoxylate in combination with 0.5 and 1%, by weight, respectively, of $H_2SO_4$. Solutions 12 to 15 contain a deposit of undissolved components. As in Example 1, the solutions were aged for 16 hours at 80° C. in thermostats. Films were extruded from the solutions which were washed with water for one hour at 70° C., and then heated for 4 and 8 hours, respectively, at 140° C. The extent to which the resulting films are discolored is then measured:

LIGHT TRANSMITTANCE OF THE 50µ-THICK FILMS IN PERCENT

| | Stabilizer | After 4 hours' ageing at 140° C.; λ in mµ | | | | | After 8 hours' ageing at 140° C.; λ in mµ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 | No additives | 63.9 | 78.4 | 86.0 | 89.5 | 91.2 | 44.2 | 66.0 | 80.0 | 86.3 | 89.2 |
| 2 | 0.5% $(CH_3SO_2)_2Zn$ | 14.6 | 28.0 | 60.4 | 77.0 | 86.0 | 8.5 | 22.0 | 47.6 | 71.6 | 82.6 |
| 3 | 1% $(CH_3SO_2)_2Zn$ | 6.2 | 13.4 | 68.5 | 68.0 | 82.2 | 2.9 | 6.7 | 30.4 | 63.3 | 81.2 |
| 4 | 0.5% $(ClCH_2SO_2)_2Zn$ | 37.8 | 69.0 | 77.1 | 85.0 | 88.3 | 21.3 | 42.1 | 67.6 | 81.0 | 86.3 |
| 5 | 1% $(ClCH_2SO_2)_2Zn$ | 39.6 | 60.8 | 78.2 | 85.6 | 88.7 | 25.8 | 47.2 | 69.7 | 80.8 | 85.1 |
| 6 | 0.5% $(ClCH_2CH_2SO_2)_2Zn$ | 44.8 | 65.1 | 78.1 | 84.2 | 86.8 | 23.0 | 45.0 | 68.7 | 80.6 | 85.5 |
| 7 | 1% $(ClCH_2CH_2SO_2)_2Zn$ | 38.0 | 59.1 | 75.7 | 83.2 | 86.3 | 20.3 | 41.7 | 66.8 | 79.8 | 85.2 |
| 8 | 0.5% $(C_6H_5SO_2)_2Zn$ | 30.4 | 51.8 | 54.9 | 84.8 | 88.9 | 20.0 | 40.3 | 67.0 | 81.1 | 86.9 |
| 9 | 1% $(C_6H_5SO_2)_2Zn$ | 16.0 | 32.5 | 60.5 | 78.7 | 86.0 | 7.9 | 19.7 | 50.6 | 74.4 | 85.0 |
| 10 | 0.5% $(CH_3\text{-}SO_2)_2Zn$ | 36.0 | 58.1 | 77.0 | 85.8 | 89.5 | 23.5 | 44.6 | 69.8 | 82.8 | 88.2 |
| 11 | 1% $(CH_3\text{-}SO_2)_2Zn$ | 13.1 | 25.8 | 56.6 | 77.9 | 87.0 | 6.5 | 16.7 | 47.4 | 72.5 | 84.3 |
| 12 | 0.5% $(HOCH_2.SO_2)_2Zn$ | 54.7 | 71.2 | 80.5 | 84.5 | 86.5 | 37.5 | 59.0 | 75.1 | 82.5 | 85.6 |
| 13 | 1% $(HOCH_2.SO_2)_2Zn$ | 51.2 | 68.5 | 78.8 | 83.2 | 85.4 | 29.6 | 52.0 | 70.7 | 79.5 | 83.0 |
| 14 | 0.5% $HOCH_2.SO_2Na + 0.5\%\ H_2SO_4$ | 66.4 | 77.9 | 83.2 | 85.8 | 87.2 | 46.3 | 65.9 | 79.6 | 84.8 | 87.3 |
| 15 | 1% $HOCH_2.SO_2Na + 1\%\ H_2SO_4$ | 63.0 | 75.0 | 81.0 | 83.5 | 85.0 | 43.6 | 63.3 | 78.1 | 83.7 | 86.3 |

It is apparent from the measured data that only in the case of sodium formaldehyde sulphoxylate is the light transmission greater than in the blank test following heat treatment. In every other case, it is lower. This compound, however, cannot be used in practice on account of its poor solubility in organic solvents. The zinc salts of sulphinic acids used in accordance with the invention for chlorine-containing acrylonitrile polymers, cannot be used as stabilizers for chlorine-free acrylonitrile polymers.

EXAMPLE 3

10% by weight of a copolymer of 60 parts by weight of acrylonitrile and 40 parts by weight of vinylidene chloride in dimethyl formamide are prepared. Solution 1, which is used as the comparison solution, does not contain any further additives, whilst each of the following solutions contains 1% by weight, based on polymer, of p-toluene sulphinic acid or of the salts with other cations than zinc. As in Example 1, the solutions are aged for 16 hours at 80° C. in thermostats, after which films are extruded from them. The resulting films are washed with water for one hour at 70° C. and then dried for 4 and 8 hours, respectively, at 140° C. The extent to which they are discolored is then measured:

chloride in dimethyl formamide are prepared. Solution 1, which is used as the comparison solution, does not contain any further additives, whilst each of the following solutions contains 1% by weight, based on polymer, of the zinc mercaptides listed in the following table and, for comparison, an equivalent quantity of free mercaptans. The solutions are aged for 16 hours at 80° C. in thermostats. Using an extrusion coater, films approximately equal thickness are extruded according to Example 1 on to glass plates and then dried at 50° C., washed for one hour in water at 70° C. and heat-treated

LIGHT TRANSMITTANCE OF THE 50μ-THICK FILMS IN PERCENT

| | Stabilizer | Appearance of the solution | After 4 hours' ageing at 140° C.; λ in mμ | | | | | After 8 hours' ageing at 140° C.; λ in mμ | | | | |
|---|---|---|---|---|---|---|---|---|---|---|---|---|
| | | | 400 | 450 | 500 | 550 | 600 | 400 | 450 | 500 | 550 | 600 |
| Solution: | | | | | | | | | | | | |
| 1 | No additives | Clear | 4.1 | 14.5 | 30.8 | 47.0 | 59.8 | 0.1 | 0.5 | 4.0 | 13.3 | 27.1 |
| 2 | 1% p-toluene sulphinic acid | do | 6.7 | 20.0 | 37.8 | 53.8 | 65.2 | 0.1 | 0.9 | 5.5 | 16.3 | 30.6 |
| 3 | 1% potassium p-toluene sulphinate | do | 4.3 | 14.3 | 29.8 | 45.3 | 58.0 | 0.1 | 0.7 | 4.7 | 15.0 | 29.4 |
| 4 | 1% morpholine p-toluene sulphinate | do | 6.9 | 20.0 | 37.7 | 54.0 | 65.9 | 0.2 | 1.7 | 8.0 | 20.5 | 35.2 |
| 5 | 1% calcium p-toluene sulphinate | Deposit | 2.5 | 9.7 | 23.6 | 38.8 | 52.5 | 0.2 | 0.4 | 2.7 | 9.5 | 21.4 |
| 6 | 1% magnesium p-toluene sulphinate | do | 3.4 | 12.3 | 27.6 | 43.6 | 57.0 | 0.1 | 0.1 | 1.9 | 8.4 | 20.2 |
| 7 | 1% cadmium p-toluene sulphinate | Clear | 21.6 | 41.2 | 57.6 | 68.5 | 75.6 | 5.6 | 17.9 | 36.1 | 57.6 | 64.8 |
| 8 | 1% lead p-toluene sulphinate | Deposit | 14.8 | 32.5 | 49.6 | 62.8 | 71.7 | 1.0 | 5.5 | 18.0 | 34.6 | 50.5 |
| 9 | 1% nickel p-toluene sulphinate | do | 18.6 | 36.8 | 53.9 | 66.3 | 74.8 | 0.6 | 4.2 | 15.3 | 31.4 | 47.7 |

The table shows that the zinc salts of Example 1 are much more effective as stabilizers than the free sulfinic acid. Since the free sulfinic acid cannot be stored, it is not suitable for practical use. Of the other salts of toluene sulfinic acid, the alkali metal and alkaline-earth metal salts cannot be used. The salts of lead and nickel have a certain effect, but they are not adequately soluble in dimethyl formamide.

for 4 to 8 hours at 140° C. The light absorption of the films is measured.

LIGHT TRANSMITTANCE OF THE 50μ-THICK FILMS IN PERCENT

| | Stabilizer | Appearance of the solution | After 4 hours' ageing at 140° C.; λ in mμ | | | | | After 8 hours' ageing at 140° C.; λ in mμ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 4.1 | 14.5 | 30.8 | 47.0 | 59.8 | 0.1 | 0.5 | 4.0 | 13.3 | 27.1 |
| 2 | 1% zinc dodecyl mercaptan | Not entirely satisfactory | 16.1 | 32.7 | 47.5 | 58.8 | 66.3 | 5.6 | 16.8 | 31.4 | 44.8 | 55.1 |
| 3 | 1% zinc thioglycol | Clear | 20.3 | 40.2 | 57.2 | 68.8 | 76.1 | 6.4 | 19.8 | 37.9 | 53.9 | 65.8 |
| 4 | 1% zinc thiophenol | do | 23.2 | 44.2 | 61.1 | 72.3 | 79.3 | 6.7 | 21.0 | 39.4 | 55.5 | 67.6 |
| 5 | 1% zinc tert.-butyl-thiophenol | do | 19.8 | 39.8 | 56.2 | 67.6 | 75.1 | 7.4 | 21.7 | 39.1 | 54.2 | 64.9 |
| 6 | 1% zinc mercaptobenzothiazole | do | 4.5 | 18.1 | 39.0 | 56.0 | 68.0 | 0.7 | 50.8 | 20.7 | 39.4 | 56.0 |
| 7 | 1% zinc mercaptobenzimidazole | do | 13.0 | 30.8 | 49.2 | 62.5 | 71.6 | 0.6 | 4.7 | 16.7 | 32.2 | 47.6 |
| 8 | 1% 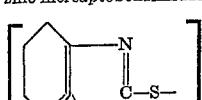 | do | 15.6 | 35.4 | 53.5 | 65.5 | 73.6 | 1.0 | 7.0 | 21.1 | 38.2 | 52.7 |
| 9 | 0.5% zinc thiobenzoate | do | 15.3 | 33.0 | 51.0 | 64.0 | 73.0 | 1.4 | 5.7 | 17.8 | 33.5 | 48.8 |
| 10 | 1% zinc thiobenzoate | do | 19.7 | 39.4 | 56.7 | 68.2 | 76.0 | 2.4 | 5.4 | 15.2 | 30.1 | 45.6 |
| 11 | 1% dodecyl mercaptan | do | 0.8 | 4.2 | 13.0 | 25.0 | 36.8 | 0.0 | 0.2 | 1.7 | 6.8 | 16.0 |
| 12 | 1% thioglycol | do | 2.8 | 12.1 | 26.9 | 43.1 | 56.4 | 0.1 | 0.4 | 3.5 | 12.2 | 25.2 |
| 13 | 1% thiophenol | do | 0.9 | 5.6 | 17.3 | 33.8 | 49.4 | 0.5 | 0.7 | 4.7 | 14.0 | 27.0 |
| 14 | 1% tert.-butylthiophenol | do | 2.4 | 10.2 | 23.9 | 39.4 | 52.4 | 0.1 | 0.2 | 2.1 | 8.9 | 20.4 |
| 15 | 1% mercaptobenzothiazole | do | 0.3 | 1.8 | 11.3 | 28.0 | 45.3 | 0.1 | 0.3 | 3.1 | 12.6 | 27.8 |
| 16 | 1% mercaptobenzimidazole | do | 0.2 | 2.1 | 10.4 | 24.2 | 40.1 | 0.0 | 0.0 | 0.1 | 1.5 | 6.8 |
| 17 | 1% 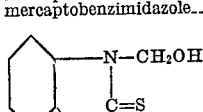 | do | 0.6 | 3.7 | 14.6 | 30.8 | 46.8 | 0.2 | 0.2 | 0.6 | 2.8 | 10.0 |
| 18 | 1% benzimidazole | do | 0.4 | 3.4 | 12.0 | 27.0 | 42.0 | 0.1 | 0.1 | 0.6 | 3.8 | 12.0 |

It is apparent from the table that the zinc salts of mercaptans have an excellent stabilizing effect on copolymers of acrylonitrile and vinylidene chloride. By contrast, the mercaptans themselves cannot be used.

EXAMPLE 5.—CAMPARISON EXAMPLE

10% by weight solutions of a vinyl chloride suspension polymer (Vestolit S–70) in tetrahydrofuran are prepared. Solution 1, which is used as the comparison solution, does not contain any further additives, whilst the

EXAMPLE 4

10% by weight of a copolymer of 60 parts by weight of acrylonitrile and 40 parts by weight of vinylidene following solutions each contain 1% by weight, based on the polymer, of one of the zinc mercaptides listed in the following table.

Films are extruded from these solutions, of which Nos. 3, 6 and 8 remain turbid. These films are washed in water for one hour at 70° C. and then heat-treated for 4 and 8 hours, respectively, at 140° C. The extent to which they are discolored is then measured:

thermostats. Using an extrusion coater, films are prepared according to Example 1 from the aged solutions, dried at 50° C., washed in water for one hour at 70° C. and heat-treated for 4 to 8 hours at 140° C.

LIGHT TRANSMITTANCE OF THE 50µ-THICK FILMS IN PERCENT

| | Stabilizer | Appearance of the solution | After 4 hours' aging at 140° C.; λ in mµ | | | | | After 8 hours' aging at 104° C.; λ in mµ | | | | |
|---|---|---|---|---|---|---|---|---|---|---|---|---|
| | | | 400 | 450 | 500 | 550 | 600 | 400 | 450 | 500 | 550 | 600 |
| Solutions: | | | | | | | | | | | | |
| 1 | No additives | Clear | 1.5 | 6.1 | 17.9 | 33.0 | 47.8 | 0.2 | 0.2 | 0.7 | 3.4 | 12.0 |
| 2 | 0.5% ZnCl₂ | do | 20.6 | 41.1 | 57.9 | 69.2 | 76.0 | 4.5 | 14.9 | 31.9 | 48.3 | 61.8 |
| 3 | 1% ZnCl₂ | do | 23.2 | 45.2 | 61.8 | 72.1 | 78.5 | 6.0 | 19.5 | 38.2 | 54.5 | 67.0 |
| 4 | 0.5% ZnSO₄·7H₂O | Deposit | 10.1 | 26.3 | 44.4 | 59.0 | 69.4 | 1.0 | 4.3 | 14.4 | 29.4 | 44.8 |
| 5 | 1% ZnSO₄·7H₂O | do | 9.9 | 24.8 | 42.4 | 56.7 | 67.2 | 0.6 | 1.0 | 4.9 | 14.5 | 28.5 |
| 6 | 0.5% Zn(NO₃)₂·6H₂O | Clear | 21.8 | 40.8 | 57.5 | 69.2 | 76.8 | 2.9 | 10.6 | 25.4 | 41.7 | 55.9 |
| 7 | 1% Zn(NO₃)₂·6H₂O | do | 19.5 | 38.6 | 55.6 | 67.2 | 74.5 | 6.7 | 20.3 | 38.5 | 54.5 | 66.2 |
| 8 | 0.25% ZnF₂ | Deposit | 19.3 | 38.3 | 54.4 | 66.1 | 74.0 | 8.4 | 20.0 | 38.1 | 53.6 | 65.0 |
| 9 | 0.5% ZnF₂ | do | 19.2 | 39.7 | 56.2 | 67.6 | 75.4 | 3.8 | 13.7 | 29.5 | 45.6 | 58.7 |
| 10 | 0.5% ZnBr₂ | Clear | 30.9 | 51.6 | 65.9 | 74.7 | 80.2 | 3.9 | 14.7 | 31.6 | 48.2 | 61.6 |
| 11 | 1% ZnBr₂ | do | 26.4 | 46.4 | 62.1 | 71.9 | 78.0 | 8.5 | 24.8 | 42.6 | 59.0 | 69.6 |
| 12 | 0.25% zinc borate | do | 18.4 | 35.8 | 52.0 | 63.9 | 71.3 | 0.8 | 4.3 | 14.7 | 29.4 | 45.0 |
| 13 | 0.5% zinc borate | do | 19.8 | 38.9 | 55.1 | 67.3 | 73.9 | 3.3 | 12.5 | 29.3 | 45.0 | 59.0 |
| 14 | 0.5% Zn(BF₄)₂ | do | 16.2 | 35.2 | 53.0 | 65.7 | 74.0 | 7.0 | 21.8 | 39.6 | 54.4 | 64.7 |
| 15 | 1% Zn(BF₄)₂ | do | 13.3 | 33.0 | 51.6 | 65.0 | 83.8 | 7.9 | 24.2 | 43.0 | 58.0 | 68.3 |
| 16 | 0.5% ZnSiF₆·6H₂O | do | 18.0 | 34.2 | 49.7 | 61.0 | 68.8 | 1.0 | 5.2 | 15.9 | 30.4 | 44.5 |
| 17 | 1% ZnSiF₆·6H₂O | do | 12.0 | 27.1 | 43.3 | 56.1 | 65.2 | 0.8 | 4.6 | 14.9 | 29.4 | 43.9 |
| 18 | 0.25% ZnSO₃·2H₂O | do | 24.5 | 42.8 | 56.9 | 66.2 | 72.4 | 1.0 | 5.2 | 16.4 | 31.9 | 46.8 |
| 19 | 0.5% ZnSO₃·2H₂O | do | 16.6 | 35.2 | 53.6 | 66.9 | 75.9 | 6.4 | 19.8 | 38.1 | 54.5 | 66.4 |
| 20 | 0.25% Zn₃(PO₄)₂·4H₂O | do | 25.1 | 44.6 | 60.1 | 70.3 | 76.7 | 1.5 | 7.2 | 20.7 | 37.7 | 52.6 |
| 21 | 0.5% Zn₃(PO₄)₂·4H₂O | Deposit | 20.1 | 39.2 | 55.6 | 66.3 | 73.4 | 1.0 | 5.8 | 18.8 | 35.6 | 51.3 |

Although zinc sulphate and zinc fluoride are effective as stabilizers, they are so difficulty soluble in dimethyl formamide that they cannot be considered for use on a large scale. Zinc chloride, zinc bromide and even zinc iodide, are quite active in the concentrations specified,

LIGHT TRANSMITTANCE OF THE 50µ-THICK FILMS IN PERCENT

| | Stabilizer | After 4 hours' ageing at 140° C.; λ in mµ | | | | | After 8 hours' ageing at 140° C.; λ in mµ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 | No additives | 64.9 | 66.5 | 69.0 | 73.9 | 79.9 | 57.7 | 62.5 | 67.1 | 73.4 | 80.8 |
| 2 | 1% zinc dodecylmercaptan | 4.2 | 10.9 | 22.0 | 33.3 | 41.0 | 1.2 | 4.2 | 12.8 | 24.6 | 35.2 |
| 3 | 1% zinc thioglycol | 65.2 | 67.4 | 70.2 | 75.6 | 81.0 | 57.0 | 62.6 | 68.0 | 74.7 | 81.8 |
| 4 | 1% zinc thiophenol | 5.4 | 12.4 | 17.9 | 20.3 | 23.3 | 1.6 | 3.3 | 7.6 | 12.0 | 15.4 |
| 5 | 1% zinc tert.-butylthiophenol | 4.8 | 12.4 | 22.3 | 30.6 | 36.0 | 1.6 | 5.3 | 13.4 | 23.6 | 32.6 |
| 6 | 1% zinc mercaptobenzimidazole | 4.4 | 9.8 | 21.6 | 39.5 | 55.7 | 1.8 | 4.6 | 12.5 | 27.4 | 46.5 |
| 7 | 1% zinc mercaptobenzthiazole | 2.6 | 6.6 | 16.0 | 29.5 | 42.6 | 2.6 | 4.1 | 10.9 | 23.9 | 39.0 |
| 8 | 1% (see structure below) | 9.7 | 17.6 | 31.3 | 48.8 | 63.3 | 4.1 | 7.8 | 17.3 | 33.1 | 51.9 |

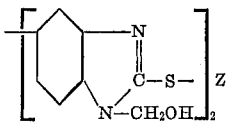

Of the zinc mercaptides listed in the table, only the thiglycol zinc is able to produce, in this film test, values for the light transmission of the polyvinyl chloride which are equivalent to those obtained with the additive-free mixture. In every other case, the light transmission underwent a considerable decrease, i.e. the films became highly dicolored. Consequently, zinc mercaptides are not suitable for use as stabilizers for films prepared from polyvinyl chloride.

EXAMPLE 6

10% by weight solutions of a copolymer of 60 parts by weight of acrylonitrile and 40 parts by weight of vinylidene chloride in dimethyl formamide are prepared. Solution 1, which is used as the comparison solution, does not contain any further additives, whilst the other solutions each contain 0.5 or 1% by weight, based on polymer, of one of the zinc salts listed in the following table. The solutions are aged for 16 hours at 80° C. in as are zinc borofluoride and zinc silicofluoride. Zinc borate and zinc sulphate are preferably used in concentrations not exceeding 0.5% by weight based on polymer, whilst zinc phosphate, zinc phosphite and zinc hypophosphite are used in concentrations not exceeding 0.25% by weight.

EXAMPLE 7.—COMPARISON EXAMPLE

10% by weight solutions of a copolymer of 95 parts by weight of acrylonitrile and 5 parts by weight of methyl acrylate in dimethyl formamide are prepared. Solution 1, which is used as the comparison solution, does not contain any further additives. The following solutions each contain 0.5 or 1%, by weight, respectively, based on polymer, of zinc chloride. As in Example 1 the solutions are aged for 16 hours at 80° C. in thermostats. Films are extruded from the solutions, washed in water for one hour at 70° C. and then aged for 4 to 8 hours, respectively, at 140° C. The extent to which they are discolored is then measured:

LIGHT TRANSMITTANCE OF THE 50µ-THICK FILMS IN PERCENT

| | Stabilizer | After 4 hours' ageing at 140° C.; λ in mµ | | | | | After 8 hours' ageing at 140° C.; λ in mµ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 | No additives | 63.9 | 78.4 | 86.0 | 89.5 | 91.2 | 44.2 | 66.0 | 80.0 | 86.3 | 89.2 |
| 2 | 0.5% ZnCl₂ | 41.3 | 62.2 | 78.0 | 85.4 | 87.9 | 23.3 | 46.0 | 69.5 | 81.8 | 86.7 |
| 3 | 1% ZnCl₂ | 19.4 | 39.4 | 66.4 | 81.5 | 86.9 | 12.8 | 32.5 | 60.5 | 76.9 | 83.0 |

Zinc chloride cannot be used as heat stabilizer for acrylonitrile polymers, for these polymers do not contain any chlorine.

and then heat-treated for 4 and 8 hours, respectively, at 140° C. The extent to which they are discolored is then measured:

LIGHT TRANSMITTANCE OF THE 50µ-THICK FILMS IN PERCENT

| | Stabilizer | After 4 hours' aging at 140° C.; λ in mµ | | | | | After 8 hours' aging at 140° C.; λ in mµ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 | No additives | 64.3 | 65.2 | 67.1 | 72.4 | 78.7 | 61.9 | 66.1 | 69.8 | 75.3 | 82.6 |
| 2 | 0.5% ZnCl₂ | 2.4 | 5.8 | 9.4 | 12.0 | 13.7 | 1.6 | 2.3 | 5.1 | 8.4 | 11.7 |
| 3 | 1% ZnCl₂ | 1.4 | 1.4 | 1.4 | 1.4 | 1.4 | 1.4 | 1.2 | 1.2 | 1.2 | 1.2 |
| 4 | 1% zinc stearate | 11.8 | 22.9 | 33.6 | 40.8 | 43.6 | 7.2 | 16.8 | 29.5 | 40.8 | 48.8 |
| 5 | 1% zinc laurate | 17.8 | 30.4 | 42.9 | 52.6 | 58.6 | 8.0 | 18.2 | 32.9 | 45.2 | 54.6 |
| 6 | 1% zinc adipate | 65.3 | 66.2 | 68.2 | 73.1 | 79.2 | 56.6 | 62.6 | 67.0 | 73.2 | 80.0 |

EXAMPLE 8

10% by weight solutions of a copolymer of 60 parts by weight of acrylonitrile and 40 parts by weight of vinylidene chloride in dimethyl formamide are prepared. Solution 1, which is used as the comparison solution, does not contain any further additives whilst the following solutions each contain 1% by weight, based on polymer, of one of the metal chlorides listed in the following table. Of these metal chlorides, only barium chloride is so difficulty soluble that a deposit is left under the influence of heat. As in Example 1, the solutions are aged for 16 hours at 80° C. in thermostats. Films are extruded from the solutions, washed in water for one hour at 70° C. and then heat-treated for 4 to 8 hours, respectively, at 140° C. The extent to which they are discolored is then measured:

Zinc chloride is unsuitable as stabilizer in polyvinyl chloride films and fibres.

EXAMPLE 10

10% by weight solutions of a copolymer of 60 parts by weight of acrylonitrile and 40 parts by weight of vinylidene chloride in dimethyl formamide, are prepared. Solution 1, which is used as the comparison solution, does not contain any further additives, whilst the following solutions each contain the specified amounts (expressed in percentages, based on the polymer) of zinc salts. The solutions are aged for 16 hours at 80° C. in thermostats. Using an extrusion coater, films are prepared according to Example 1 from the aged solutions, dried at 50° C.. washed in water for one hour at 70° C. and heat-treated for 4 and 8 hours, at 140° C.

LIGHT TRANSMITTANCE OF THE 50µ-THICK FILMS IN PERCENT

| | Stabilizer | Appearance of solution | After 4 hours' ageing at 140° C.; λ in mµ | | | | | After 8 hours' ageing at 140° C.; λ in mµ | | | | |
|---|---|---|---|---|---|---|---|---|---|---|---|---|
| | | | 400 | 450 | 500 | 550 | 600 | 400 | 450 | 500 | 550 | 600 |
| Solution: | | | | | | | | | | | | |
| 1 | No additives | Clear | 1.0 | 5.8 | 18.3 | 34.4 | 49.4 | 0.1 | 0.1 | 0.6 | 4.1 | 12.9 |
| 2 | 0.25% zinc acetate | do | 14.1 | 30.3 | 47.4 | 60.4 | 69.7 | 0.5 | 3.9 | 15.7 | 28.4 | 43.8 |
| 3 | 0.5% zinc acetate | do | 18.0 | 35.7 | 52.7 | 64.6 | 71.8 | 3.5 | 13.4 | 29.2 | 45.8 | 50.3 |
| 4 | 1% zinc acetate | do | 13.1 | 30.9 | 48.8 | 62.2 | 71.6 | 3.0 | 11.8 | 26.9 | 43.4 | 50.3 |
| 5 | 0.5% zinc laurate | Deposit | 24.9 | 44.1 | 49.2 | 70.2 | 77.0 | 3.5 | 12.1 | 27.4 | 43.6 | 57.2 |
| 6 | 1% zinc laurate | do | 20.6 | 47.4 | 62.8 | 72.4 | 78.2 | 6.4 | 19.4 | 37.2 | 53.4 | 65.8 |
| 7 | 0.5% zinc stearate | do | 10.7 | 27.2 | 45.6 | 60.2 | 70.5 | 0.9 | 4.1 | 13.8 | 28.6 | 44.2 |
| 8 | 1% zinc stearate | do | 18.2 | 35.6 | 51.0 | 62.2 | 70.0 | 3.9 | 13.0 | 27.5 | 41.9 | 54.2 |
| 9 | 0.25% zinc oxalate | do | 19.0 | 38.5 | 55.9 | 67.5 | 75.0 | 1.7 | 9.3 | 22.2 | 38.4 | 52.7 |
| 10 | 0.5% zinc oxalate | do | 22.3 | 43.4 | 60.2 | 71.0 | 77.8 | 3.0 | 13.3 | 30.8 | 47.8 | 61.0 |
| 11 | 0.5% zinc adipate | do | 8.8 | 23.9 | 42.4 | 57.8 | 68.7 | 1.4 | 4.5 | 14.5 | 29.3 | 44.7 |
| 12 | 1% zinc adipate | do | 15.0 | 33.3 | 51.7 | 65.1 | 74.2 | 1.4 | 4.5 | 14.5 | 30.3 | 45.7 |

LIGHT TRANSMITTANCE OF THE 50µ-THICK FILMS IN PERCENT

| | Stabilizer | Appearance of the solution | After 4 hours' ageing at 140° C.; λ in mµ | | | | | After 8 hours' ageing at 140° C.; λ in mµ | | | | |
|---|---|---|---|---|---|---|---|---|---|---|---|---|
| | | | 400 | 450 | 500 | 550 | 600 | 400 | 450 | 500 | 550 | 600 |
| Solution: | | | | | | | | | | | | |
| 1 | No additives | Clear | 1.5 | 6.1 | 17.9 | 33.0 | 47.8 | 0.2 | 0.2 | 0.7 | 3.4 | 12.0 |
| 2 | 1% ZnCl₂ | do | 20.6 | 41.1 | 57.9 | 69.2 | 76.0 | 4.5 | 14.9 | 31.9 | 48.3 | 61.8 |
| 3 | 1% CaCl₂ | do | 7.6 | 20.9 | 37.2 | 51.4 | 62.0 | 0.3 | 0.7 | 4.3 | 13.0 | 26.0 |
| 4 | 1% MgCl₂ | do | 5.7 | 17.0 | 26.0 | 47.0 | 59.0 | 0.5 | 1.9 | 7.9 | 19.0 | 33.1 |
| 5 | 1% MgCl₂.6H₂O | do | 5.8 | 17.0 | 26.0 | 47.0 | 59.0 | 0.2 | 0.5 | 2.5 | 8.7 | 19.7 |
| 6 | 1%BaCl₂.2H₂O | Deposit | 0.5 | 3.1 | 11.3 | 24.6 | 39.2 | 0.2 | 0.2 | 0.4 | 2.1 | 7.7 |
| 7 | 1% PbCl₂ | Almost clear | 9.0 | 24.1 | 41.3 | 55.5 | 65.8 | 0.9 | 4.6 | 14.8 | 29.4 | 44.3 |
| 8 | 1% ZnCl₂.2CO(NH₂)₂ | Clear | 27.6 | 48.2 | 63.3 | 72.6 | 78.2 | 6.7 | 19.7 | 37.1 | 52.6 | 64.3 |

Unlike zink chloride; calcium chloride, barium chloride, magnesium chloride and lead chloride are ineffective or are only slightly effective as stabilizers.

EXAMPLE 9.—COMPARISON EXAMPLE

10% by weight solutions of a vinyl chloride suspension polymer (Vestolit S-70) in tetrahydrofuran are prepared. Solution 1, which is used as the comparison solution, does not contain any further additives, whilst the following solutions each contain 0.5 or 1% by weight based on polymer, of zinc chloride. Films are extruded from the solutions thus prepared, of which Nos. 6, 7, 8 and 9 remain turbid, are washed in water for one hour at 70° C.

EXAMPLE 11

10% by weight solutions of a copolymer of 60 parts by weight of acrylonitrile and 40 parts by weight of vinylidene chloride in dimethyl formamide are prepared. Solution 1, which is used as the comparison solution, does not contain any further additives, whilst the following solutions each contain the specified quantities (expressed as percentages by weight, based on the polymer), of zinc salts. As in Example 1, the solutions are aged for 16 hours at 80° C. in thermostats. Films are extruded from the solutions, washed in water for one hour at 70° C. and then heat-treated for 4 to 8 hours, respectively, at 140° C. The extent to which they are discolored is then measured:

aged for 16 hours at 80° C. in thermostats. Films are extruded from the solutions, washed in water for 1 hour

LIGHT TRANSMITTANCE OF THE 50μ-THICK FILMS IN PERCENT

| Stabilizer | Appearance of the solution | After 4 hours' ageing at 140° C.; λ in mμ | | | | | After 8 hours' aging at 140° C.; λ in mμ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 ........ No additives ............ | Clear ............ | 0.6 | 1.7 | 8.7 | 22.0 | 37.0 | 0.05 | 0.1 | 0.5 | 3.1 | 10.4 |
| 2 ........ 0.5% zinc acetate ........ | do ............ | 15.4 | 34.0 | 52.2 | 65.5 | 74.2 | 4.0 | 13.5 | 29.4 | 45.5 | 59.1 |
| 3 ........ 1% zinc acetate ........ | do ............ | 10.6 | 26.9 | 44.5 | 57.8 | 66.9 | 1.0 | 1.2 | 4.8 | 14.6 | 28.7 |
| 4 ........ 0.5% zinc levulinate ........ | do ............ | 14.0 | 31.4 | 49.6 | 63.4 | 72.8 | 0.6 | 1.0 | 4.9 | 15.4 | 30.1 |
| 5 ........ 1% zinc levulinate ........ | do ............ | 13.4 | 30.9 | 49.3 | 63.5 | 73.4 | 0.9 | 2.8 | 11.1 | 25.0 | 40.6 |
| 6 ........ 0.5% zinc crotonated ........ | do ............ | 6.1 | 18.9 | 36.4 | 52.6 | 65.0 | 0.9 | 4.6 | 14.9 | 29.5 | 44.9 |
| 7 ........ 1% zinc crotonate ........ | do ............ | 8.9 | 23.8 | 41.9 | 56.9 | 68.1 | 1.5 | 6.5 | 18.6 | 34.2 | 49.5 |
| 8 ........ 0.5% zinc n-butyrate ........ | Dissolved after heating ........ | 19.1 | 37.7 | 54.1 | 66.0 | 74.0 | 3.6 | 12.7 | 28.5 | 44.7 | 58.7 |
| 9 ........ 1% zinc n-butyrate ........ | do ............ | 14.1 | 32.7 | 51.0 | 64.7 | 74.2 | 1.8 | 8.2 | 22.2 | 39.0 | 54.1 |
| 10 ........ 0.5% zinc isobutyrate ........ | Clear ............ | 18.4 | 37.0 | 54.6 | 67.0 | 75.2 | 1.7 | 5.3 | 16.8 | 32.5 | 47.9 |
| 11 ........ 1% zinc isobutyrate ........ | do ............ | 11.7 | 28.9 | 57.0 | 61.2 | 71.2 | 1.7 | 6.2 | 17.9 | 33.7 | 48.6 |
| 12 ........ 0.5% zinc 5-tert-butyl-salicylate ........ | do ............ | 9.0 | 23.5 | 41.6 | 56.2 | 77.1 | 1.2 | 4.2 | 14.0 | 28.9 | 43.8 |
| 13 ........ 1% [structure] | do ............ | 23.0 | 43.2 | 60.4 | 71.7 | 79.0 | 3.5 | 12.7 | 29.5 | 46.4 | 60.2 |

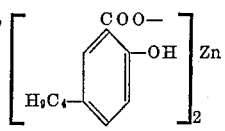

EXAMPLE 12

10% by weight solutions of a copolymer of 60 parts by weight of acrylonitrile and 40 parts by weight of vinylidene chloride in dimethyl formamide are prepared. Solution 1, which is used as the comparison solution, does not contain any further additives, whilst the following solutions each contain the specified amounts (expressed in percentages, based on the polymer), of zinc salts. As in Example 1, the solutions are aged for 16 hours at 80° C. in thermostats. Films are extruded from the solutions, washed in water for 1 hour at 70° C. and then dried for four and eight hours, respectively, at 140° C.; the extent to which they are discolored is then measured:

at 70° C. and then heat-treated for 4 and 8 hours, respectively, at 140° C. The extent to which they are discolored is then measured:

LIGHT TRANSMITTANCE OF THE 50μ-THICK FILMS IN PERCENT

| Stabilizer | Appearance of the solution | After 4 hours' ageing at 140° C.; λ in mμ | | | | | After 8 hours' ageing at 140° C.; λ in mμ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 ........ No additives ........ | Clear ........ | 63.9 | 78.4 | 86.0 | 89.5 | 91.2 | 44.2 | 66.0 | 80.0 | 86.3 | 89.2 |
| 2 ........ 0.5% zinc acetate ........ | do ........ | 15.0 | 32.7 | 64.0 | 82.8 | 89.0 | 9.0 | 25.0 | 56.2 | 77.6 | 78.3 |
| 3 ........ 1% zinc acetate ........ | do ........ | 2.3 | 8.1 | 38.8 | 72.9 | 85.4 | 0.9 | 4.4 | 30.0 | 66.2 | 82.1 |
| 1 ........ No additives ........ | do ........ | 65.2 | 80.5 | 86.9 | 89.9 | 91.3 | 45.7 | 66.5 | 79.3 | 85.0 | 87.6 |
| 2 ........ 1% zinc formate ........ | do ........ | 3.3 | 10.9 | 41.9 | 72.7 | 85.0 | 4.3 | 13.2 | 44.6 | 73.4 | 85.0 |
| 3 ........ 1% n-zinc n-butyrate ........ | Somewhat cloudy ........ | 14.0 | 31.1 | 61.2 | 80.0 | 86.5 | 6.3 | 19.1 | 52.0 | 76.0 | 85.3 |
| 4 ........ 1% zinc isobutyrate ........ | Clear ........ | 3.8 | 13.7 | 47.0 | 75.2 | 85.5 | 2.2 | 8.4 | 39.5 | 71.2 | 83.9 |
| 5 ........ 1% zinc crotonate ........ | do ........ | 7.6 | 20.7 | 54.2 | 79.1 | 87.8 | 2.8 | 10.6 | 41.8 | 71.0 | 83.1 |
| 6 ........ 1% zinc levulinate ........ | do ........ | 9.5 | 24.6 | 56.3 | 78.0 | 86.1 | 3.6 | 13.1 | 44.1 | 71.5 | 82.9 |
| 7 ........ 1% zinc benzoate ........ | do ........ | 5.5 | 16.6 | 49.9 | 76.0 | 85.6 | 1.5 | 6.2 | 35.0 | 69.0 | 83.5 |
| 8 ........ 1% zinc 5-tert.-butyl-salicylate ........ | do ........ | 28.6 | 48.2 | 72.4 | 85.0 | 89.6 | 18.0 | 36.2 | 64.8 | 81.7 | 87.9 |

The light transmission of the acrylonitrile-methylacrylate copolymer films is considerably lower than the value of the comparison test, i.e. the zinc compounds listed in the table cannot be used as stabilizers for chlorine-free acrylonitrile polymers.

EXAMPLE 14.—COMPARISON EXAMPLE

10% by weight solutions of a vinyl chloride suspension polymer (Vestolit S–70) in tetrahydrofuran, are prepared. Solution 1, which is used as the comparison solution does not contain any further additives, whilst the following solutions contain the specified quantities (expressed in percentages by weight, based on polymer), of the zinc compounds listed in the following table. Films are extruded from the solutions thus prepared, washed in water for 1 hour at 70° C. and then dried for 4 to 8 hours, respectively, at 140° C.

LIGHT TRANSMITTANCE OF THE 50μ-THICK FILMS IN PERCENT

| Stabilizer | Appearance of the solution | After 4 hours' ageing at 140° C.; λ in mμ | | | | | After 8 hours' ageing in 140° C.; λ in mμ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 ........ No additive ........ | Clear ........ | 1.5 | 7.2 | 19.8 | 35.4 | 49.7 | 0.1 | 1.6 | 1.6 | 7.1 | 17.9 |
| 2 ........ 1% zinc acetate ........ | do ........ | 19.5 | 39.0 | 55.7 | 67.1 | 74.4 | 2.7 | 11.5 | 27.6 | 44.3 | 57.8 |
| 3 ........ 1.5% zinc acetate ........ | do ........ | 16.4 | 35.6 | 53.0 | 65.6 | 74.2 | 4.0 | 14.0 | 30.2 | 46.4 | 59.6 |
| 4 ........ 1% zinc formate ........ | do ........ | 8.7 | 24.6 | 43.3 | 58.6 | 69.6 | 1.6 | 7.7 | 22.0 | 39.0 | 54.0 |
| 5 ........ 1.5% zinc formate ........ | do ........ | 14.9 | 34.0 | 54.6 | 64.6 | 73.5 | 1.5 | 5.7 | 18.0 | 34.0 | 49.5 |
| 6 ........ 1% zinc benzoate ........ | do ........ | 4.3 | 16.3 | 34.0 | 50.4 | 63.2 | 5.7 | 18.1 | 35.9 | 51.5 | 63.4 |
| 7 ........ 1.5% zinc benzoate ........ | do ........ | 8.0 | 23.5 | 42.0 | 56.6 | 68.0 | 2.8 | 10.6 | 25.7 | 42.0 | 55.6 |

EXAMPLE 13.—COMPARISON EXAMPLE

10% by weight solutions of a copolymer of 95 parts by weight of acrylonitrile and 5 parts by weight of methyl acrylate in dimethyl formamide are prepared. Solution 1, which is used as the comparison solution, does not contain further additives, whilst the following solutions contain the specified amounts (expressed in percentages by weight, based on polymer), of the zinc compounds listed in the following table. As in Example 1, the solutions are The extent to which they are discolored in then measured:

LIGHT TRANSMITTANCE OF THE 50μ-THICK FILMS IN PERCENT

| | Stabilizer | After 4 hours' ageing at 140° C.; λ in m/μ | | | | | After 8 hours' ageing at 140° C.; λ in m/μ | | | | |
|---|---|---|---|---|---|---|---|---|---|---|---|
| | | 400 | 450 | 500 | 550 | 600 | 400 | 450 | 500 | 550 | 600 |
| Solution: | | | | | | | | | | | |
| 1 | No additives | 64.3 | 65.2 | 67.1 | 72.4 | 78.7 | 61.9 | 66.1 | 69.8 | 75.3 | 82.8 |
| 2 | 0.5% zinc acetate | 7.9 | 17.9 | 28.1 | 34.8 | 38.3 | 3.6 | 11.0 | 23.1 | 34.8 | 43.6 |
| 3 | 1% zinc acetate | 5.3 | 11.1 | 15.3 | 16.6 | 17.2 | 2.0 | 4.0 | 7.9 | 10.9 | 13.3 |
| 4 | 1% zinc laurate | 17.8 | 30.4 | 42.9 | 52.6 | 58.6 | 8.0 | 18.2 | 32.9 | 45.2 | 54.6 |
| 5 | 0.5% zinc stearate | 15.0 | 20.0 | 43.1 | 54.8 | 61.6 | 11.2 | 23.5 | 39.1 | 53.4 | 63.6 |
| 6 | 1% zinc stearate | 11.8 | 22.9 | 33.6 | 40.8 | 44.6 | 7.2 | 16.8 | 29.5 | 40.8 | 48.8 |
| 7 | 1% zinc benzoate | 3.5 | 8.8 | 12.0 | 13.0 | 13.8 | 0.2 | 1.4 | 3.8 | 6.5 | 8.9 |
| 8 | 1.5% zinc benzoate | 2.0 | 4.1 | 5.0 | 4.8 | 5.0 | 1.4 | 1.4 | 1.6 | 2.3 | 3.2 |
| 9 | 1% zinc adipate | 65.3 | 66.3 | 68.2 | 73.1 | 79.2 | 56.6 | 62.6 | 67.0 | 73.2 | 80.0 |

The zinc salts of carboxylic acids listed in the table cannot be used as heat stabilizers for polyvinyl chloride films.

What we claim is:

1. A composition comprising a solution of a copolymer acrylonitrile and vinylidene chloride having a chlorine content of 20 to 60% in a polar organic solvent selected from the group consisting of dimethyl formamide and dimethylacetamide having therein 0.01 to 5% by weight based on the copolymer of a stabilizer against heat comprising a zinc salt of a member selected from the group consisting of $C_1$ to $C_2$ alkylsulfinic acids, phenylsulfinic acid, p-toluene sulfinic acid, benzoic acid, tertiary butyl salicylic acid, an inorganic acid selected from the group consisting of hydrochloric acid, hydrobromic acid, hydroiodic acid, nitric acid, boric acid, sulfurous acid, hydrosilicofluoric acid, hydroborofluoric acid and a mercaptan selected from the group of thioglycolic acid, thiobenzoic acid, thiophenol, tertiary butylthiophenol, mercaptobenzothiazole and mercaptobenzimidazole.

2. A composition according to claim 1, wherein said zinc salt is present in an amount of 0.5 to 1.5% by weight based on the copolymer.

3. A composition according to claim 1, wherein said copolymer is present in said solution in an amount of from 5 to 35%.

4. A composition according to claim 1, wherein said zinc salt is zinc chloride.

5. A composition according to claim 1 wherein said zinc stabilizer is the salt of p-toluene sulfinic acid.

6. A composition according to claim 1, wherein said zinc salt is zinc thioglycollate.

7. A composition according to claim 1, wherein said zinc salt is zinc nitrate.

8. A composition comprising a copolymer of acrylonitrile and vinylidene chloride having a chlorine content of 20 to 60% having therein 0.01 to 5% by weight based on the copolymer of a stabilizer against heat, comprising a zinc salt of a member selected from the group consisting of $C_1$ to $C_2$ alkylsulfinic acids, phenylsulfinic acid, p-toluene sulfinic acid, benzoic acid, tertiary butyl salicylic acid, an inorganic acid selected from the group consisting of hydrochloric acid, hydrobromic acid, hydroiodic acid, nitric acid, boric acid, sulfurous acid, hydrosilicofluoric acid, hydroborofluoric acid and a mercaptan selected from the group of thioglycolic acid, thiobenzoic acid, thiophenol, tertiary butylthophenol, mercaptobenzothiazole and mercaptobenzimidazole.

References Cited

UNITED STATES PATENTS 2,878,231  3/1959  Campbell et al. _____ 260—32.6
3,088,932  5/1963  Tarkington et al. ___ 260—45.75

DONALD E. CZAJA, Primary Examiner.

V. P. HOKE, Assistant Examiner.

U.S. Cl. X.R.

260—45.7, 45.75, 45.8, 45.95

UNITED STATES PATENT OFFICE
CERTIFICATE OF CORRECTION

Patent No. 3,436,364

April 1, 196

Heino Logemann et al.

It is certified that error appears in the above identified patent and that said Letters Patent are hereby corrected as shown below:

Column 1, line 19, "vinylindene" should read -- vinylidene --. Column 3, line 25, "mercapstans" should read -- mercaptans --. Column 4, line 30, "foramide" should read -- formamide --; line 73, "degration" should read -- degradation --. Columns 5 and 6, first table, first column, insert the heading -- Solution --; same table, seventh column, line 11 thereof "71.2" should read -- 72.1 --. Column 8, line 9, before "approximately" insert -- of --. Column 9, line 49, "thiglycol" should read -- thioglycol --. Columns 9 and 10, first table, last major heading, line 1 thereof, "After 8 hours' aging at 104°" should read -- After 8 hours aging at 140° --. Column 10, line 27 and column 11, line 27, "difficulty", each occurrence, should read -- difficultly --. Columns 11 and 12, first table, seventh column, line 4 thereof, "43.6" should read -- 44.6 --. Columns 13 and 14, in the first table, second column, line 6 thereof, "0.5% zinc crotonated" should read -- 0.5% zinc crotonate --; same table, seventh column, line 2 thereof, "65.5" should read -- 65.4 --. Column 16, line 30, "butylthophenol" should read -- butylthiophenol --.

Signed and sealed this 14th day of April 1970.

(SEAL)
Attest:

EDWARD M.FLETCHER,JR.
Attesting Officer

WILLIAM E. SCHUYLER, J
Commissioner of Patent